US006985103B2

(12) United States Patent
Ridderheim et al.

(10) Patent No.: US 6,985,103 B2
(45) Date of Patent: Jan. 10, 2006

(54) PASSIVE AIRBORNE COLLISION WARNING DEVICE AND METHOD

(75) Inventors: Stefan Ridderheim, Sundsvall (SE); Bjorn Lindmark, Stockholm (SE); Hans Nystrom, Ekero (SE)

(73) Assignee: Navaero AB, Sundsvall (SE)

( * ) Notice: Subject to any disclaimer, the term of this patent is extended or adjusted under 35 U.S.C. 154(b) by 0 days.

(21) Appl. No.: 10/604,535

(22) Filed: Jul. 29, 2003

(65) Prior Publication Data

US 2005/0024256 A1 Feb. 3, 2005

(51) Int. Cl.
*G01S 13/93* (2006.01)
*G01S 13/74* (2006.01)

(52) U.S. Cl. ............ 342/30; 342/27; 342/29; 342/32; 342/42; 342/43; 342/175; 342/357.01; 342/357.06; 342/195; 701/300; 701/301

(58) Field of Classification Search ............ 342/27–51, 342/450–465, 357.01–357.17, 118, 126–139, 342/146, 147, 175, 195; 701/300–302
See application file for complete search history.

(56) References Cited

U.S. PATENT DOCUMENTS

| | | | | | |
|---|---|---|---|---|---|
| 3,713,161 | A | * | 1/1973 | Rice | 342/455 |
| 3,792,472 | A | * | 2/1974 | Payne et al. | 342/32 |
| 3,875,570 | A | * | 4/1975 | Litchford | 342/32 |
| 3,895,382 | A | | 7/1975 | Litchford | |
| 3,921,172 | A | * | 11/1975 | Litchford | 342/32 |
| 3,947,845 | A | * | 3/1976 | Lyon | 342/30 |
| 3,959,793 | A | * | 5/1976 | Litchford | 342/32 |
| 4,021,802 | A | * | 5/1977 | Litchford | 342/32 |
| 4,027,307 | A | * | 5/1977 | Litchford | 342/32 |
| RE29,260 | E | * | 6/1977 | Litchford | 342/32 |
| 4,115,771 | A | * | 9/1978 | Litchford | 342/37 |
| 4,161,729 | A | * | 7/1979 | Schneider | 342/32 |
| 4,486,755 | A | * | 12/1984 | Hulland et al. | 342/32 |
| 4,710,774 | A | * | 12/1987 | Gunny | 342/455 |
| 4,768,036 | A | * | 8/1988 | Litchford et al. | 342/455 |
| 4,782,450 | A | * | 11/1988 | Flax | 701/301 |
| 4,839,658 | A | * | 6/1989 | Kathol et al. | 342/455 |
| 5,075,694 | A | | 12/1991 | Donnangelo et al. | |
| 5,077,673 | A | * | 12/1991 | Brodegard et al. | 701/301 |
| 5,157,615 | A | * | 10/1992 | Brodegard et al. | 701/301 |
| 5,196,856 | A | | 3/1993 | Litchford et al. | |
| 5,388,047 | A | | 2/1995 | Ryan et al. | |
| 6,344,820 | B1 | | 2/2002 | Shiomi et al. | |

* cited by examiner

*Primary Examiner*—Bernarr E. Gregory
(74) *Attorney, Agent, or Firm*—Albihns Stockholm AB; Reginald Finn

(57) ABSTRACT

A passive airborne mounted collision warning system suitable for light aircraft that enables an observer aircraft to determine the position of a nearby transponder-equipped target aircraft. The transponder-equipped target aircraft transmits replies responsive to interrogation signals from rotating secondary surveillance radars (SSR). In an embodiment of the invention, position of the target aircraft is determined based on the known position of the observer aircraft obtained e.g. via satellite navigation means such as GPS, the position of the SSR, and the bearing of the target aircraft measured by a direction finding antenna. The direction-finding antenna elements and the GPS receiver components are included in a device that is externally mounted on the observer aircraft. The data from the device is connected to a portable computer for processing and presentation to the pilot to alert him of the position of the target aircraft for avoiding collisions.

22 Claims, 6 Drawing Sheets

PASSIVE AIRBORNE COLLISION WARNING DEVICE AND METHOD

BACKGROUND OF INVENTION

Field of the Invention

The present invention relates generally to traffic collision warning devices for detecting and locating moving objects suitably equipped with transponders. More particularly, it relates to a low-cost passive airborne collision warning system (PACWS) and method for tracking nearby aircraft for use in collision avoidance.

It has long been recognized that the potential for aircraft collisions increases substantially in area of high traffic density. The tremendous growth in air travel in the 1960s led to an awareness that something should be done in order to prevent mid-air collisions that were often catastrophic. In response the civil aviation authorities mandated the use of a collision avoidance system in the early 1970s for all aircraft flying in controlled airspace generally known as collision avoidance systems such as the National Air Traffic Control Radar Beacon System. The system enables control towers to determine the heading and location of all transponder-equipped aircraft flying in its controlled airspace. The transponders, which are required to be carried by all aircraft flying in controlled airspace, respond to interrogation signals transmitted from ground-based rotating secondary surveillance radars (SSRs). The interrogated transponder responds by broadcasting a coded signal containing information related to the aircraft, such as its 4-digit ID operating in Mode A or its ID and altitude information operating in Mode C. In countries such as Germany for example, use of Mode S capable transponders is required that enable a ground-air-ground data link to be established to provide support for automated air traffic control in heavy air traffic environments.

Interrogation signals from the rotating SSR are highly directional and are comprised of a series of three pulses separated by a specific delay that are transmitted on a carrier frequency of 1030 MHz, whereas the transponder signals are omni-directional and transmit on 1090 MHz. The SSRs are equipped with a phased array antenna in which the interrogation signals are transmitted on a narrow rotating main beam (typically about 1 complete revolution per 5–12 seconds) that is accompanied by a number of side lobes that have relatively lower signal power. The delay between the pulses specifies the information the transponder should transmit. The amplitude of the pulses are compared to ensure that transponder responds to interrogation by the main beam and not from the side lobes.

FIG. 1 shows a graphic depiction of the interrogation and reply signals according to TSO-C47c specification of the internationally standardized Air Traffic Control Radar Beacon System (ATCRBS). There are several interrogation modes, the most common being Mode A that is a request for an identification code, and Mode C that also asks for the altitude of the responding aircraft. Mode B is currently not used in U.S. operations and Mode D is unassigned at the present time. As can be seen from the figure, the distance between two pulses determines the Mode of interrogation and the range to the aircraft is determined by the time delay. These systems typically have ranges up to at least 100 nautical miles. The transponder reply signals received by the control tower and plotted on a tracking screen and updated frequently to enable the air traffic controller to constantly track all aircraft in its assigned air space. It is then up to the controller to interpret and assess the risk of a collision which he/she attempts to prevent by communicating with the pilots by radio.

There have been many attempts in the past to further improve on these collision avoidance systems. One such system is the Traffic/Airborne alert and Collision Avoidance System (TCAS/ACAS) as proposed by the U.S. Federal Aviation Administration. TCAS II is currently required in the United States on all commercial aircraft having more than 30 seats. Many other countries already have or will likely mandate the use of airborne collision avoidance systems in the near future. TCAS essentially involves an airborne SSR-like system that is capable of actively interrogating surrounding transponder-equipped aircraft with in order to elicit information coded replies that can alert the pilot to the presence of nearby aircraft.

FIG. 2 is a schematic view of an exemplary airborne TCAS/ACAS system. The airborne TCAS/ACAS on the observer aircraft sends out a coded interrogation signal Q1 that is received by transponder-equipped aircraft A1 and A2. The transponders are responsive to the interrogations and transmit replies R1 and R2 respectively on 1090 MHz. The observer aircraft receives the replies and determines whether the aircraft poses a threat of a collision. However, fully equipped systems such as these are quite expensive are more suitable for use with large commercial aircraft since they can run into the hundreds of thousands of dollars.

There are products on the market that provide “lower” cost traffic avoidance systems for use with smaller aircraft. Some of these systems operate on the principle of passively detecting nearby threatening aircraft by analyzing their transponder replies in response to interrogations by the SSR. However, the costs of many of these systems are typically in the range of tens of thousands of dollars, which is still a bit too costly to encourage widespread use by light aircraft that are exempt from the regulations.

U.S. Pat. No. 4,027,307 issued to Lichford describes a collision avoidance and proximity warning system for passively determining the range and bearing of nearby aircraft within a selectable proximity to the observer’s aircraft. In the method, the observer’s aircraft listens for replies of nearby aircraft to the same interrogation to which its own transponder has just replied and determines the bearing of the intruder aircraft with respect to the axis of the observer’s aircraft. However, as described on column 5, lines 11–19, an aircraft that intrude upon the listen-in region will be detected but an aircraft outside this region will not be detected. Thus the limited scope of detection of the method could lead to a failure to detect potentially threatening aircraft flying toward the observer’s aircraft.

U.S. Pat. Nos. 5,077,673 and 5,157,615 issued to Brodegard et al. and assigned to Ryan International Corp. are related patents issued to the same assignee that describes a collision avoidance device mounted in an aircraft and operates by listening to replies from other transponder carrying aircraft responding to SSR interrogations. The method, as stated in column 7, lines 15–41 of the ’673 patent and similarly stated in the ’615 patent, does not attempt to “establish precise range parameters” between a potential threat aircraft to the host aircraft. Instead, the primary parameter used is altitude detection with the idea that a collision between aircraft is not possible unless they are at or near the same altitude. Furthermore, changes in amplitude of the received signal are analyzed with the idea that increasing amplitude indicates that the traffic is closing in distance and thus a potential threat may exist. This method detects when an aircraft enters a potentially threatening zone around the host aircraft but does not produce sufficient information to accurately display the threatening aircraft's position and bearing to better assist the pilot in determining the best maneuver to avoid a collision.

In view of the foregoing, it is desirable to provide a low-cost airborne collision warning device and method that suitable for use in light aircraft that enables accurate determination of information such as range, and bearing, speed etc. to track nearby aircraft for collision avoidance.

SUMMARY OF INVENTION

Briefly described and in accordance with the embodiment and related features thereof, the present invention is directed to a method and system for determining the position of at least one transponder-equipped target aircraft relative to an observer aircraft. The transponder-equipped target aircraft transmits replies responsive to interrogation signals from rotating radar sources. In a preferred embodiment of the invention, the radar sources are secondary surveillance radars (SSRs). In the embodiment, the position of the observer aircraft is determined via satellite navigation means such as the GPS or Galileo navigation systems or non-satellite means, for example. Next the position and thus the range of the SSR is determined, relative to the observer aircraft, using a direction-finding antenna by measuring the bearing on at least two interrogation signals, but on preferably three. The bearing of the target aircraft is measured by direction-finding on its replies to interrogation requests by the SSR. The distance of the cumulative propagation of the interrogation signal from the radar source to the target aircraft and reply signal from the target aircraft to the observer aircraft is calculated by measuring the total propagation time received at the observer aircraft. The position of the target aircraft, relative to the observer aircraft, is determined based on the bearing of the target aircraft, the distance of cumulative signal propagation associated with the target aircraft, and the range to the SSR from the observer aircraft.

In a system aspect, an embodiment of the present invention is directed to a passive airborne mounted collision warning system enabling an observer aircraft to determine the position of a nearby transponder-equipped target aircraft. The system comprises direction-finding antenna elements and GPS receiver components that are included in a device that is externally mounted on the observer aircraft. The data from the device is connected to a portable computer for processing and suitable presentation to the pilot to alert him of the position of the target aircraft to avoid collisions. A visual presentation of the relative position of the target aircraft may be shown a on a display that is conveniently accessible to the pilot while flying the aircraft, for example, on the cockpit instrument panel or on a separate display attached to the pilot's leg. Alternatively, the presentation can include audio warnings for alerting the pilot of the presence or position of the target aircraft to assist in maneuvers for collision avoidance.

BRIEF DESCRIPTION OF DRAWINGS

The invention, together with further objectives and advantages thereof, may best be understood by reference to the following description taken in conjunction with the accompanying drawings in which.

DETAILED DESCRIPTION

Figure 1:
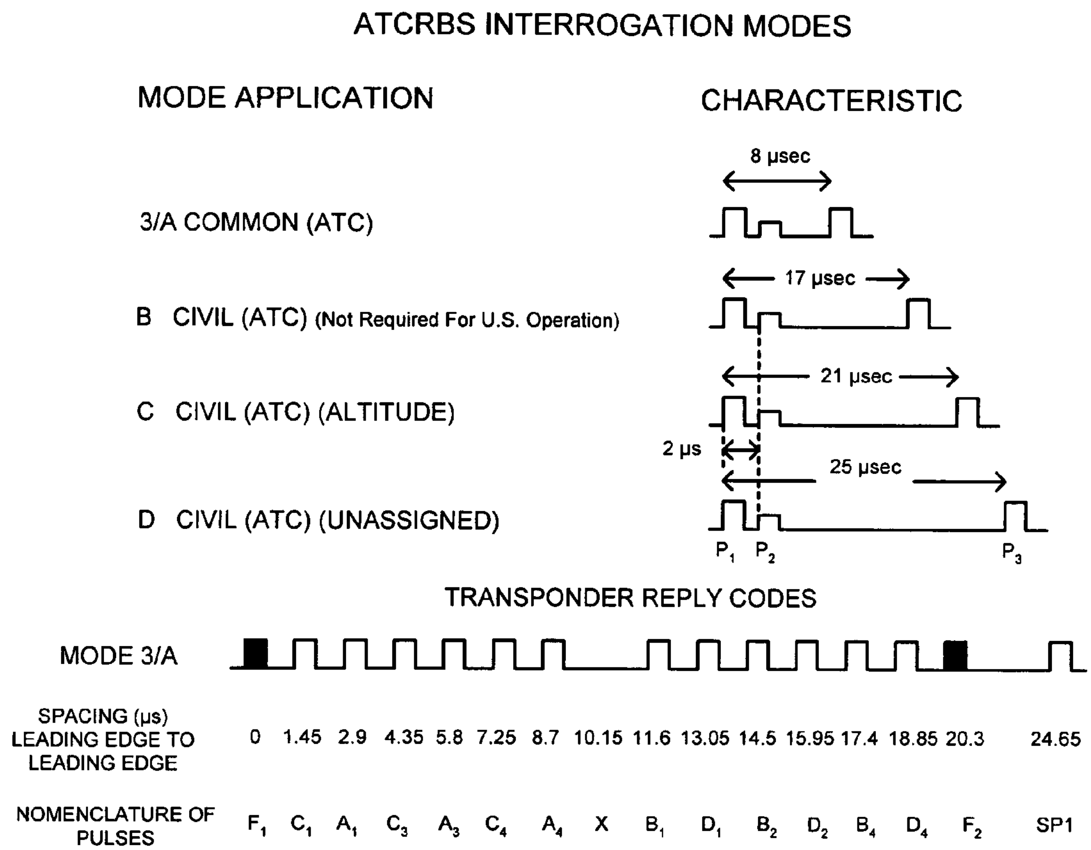
FIG. 1 shows a graphic depiction of the internationally standardized interrogation and reply signals.
Figure 2:
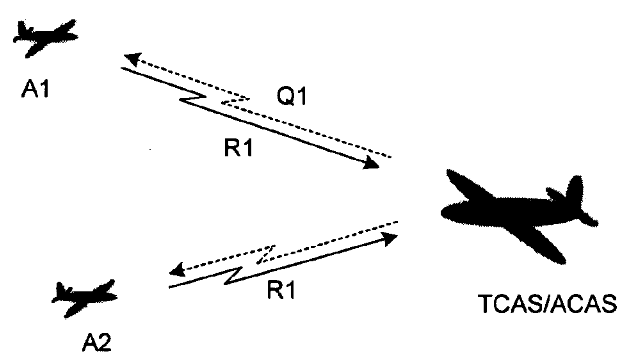
FIG. 2 is a schematic view of an exemplary airborne TCAS/ACAS system.
Figure 3:
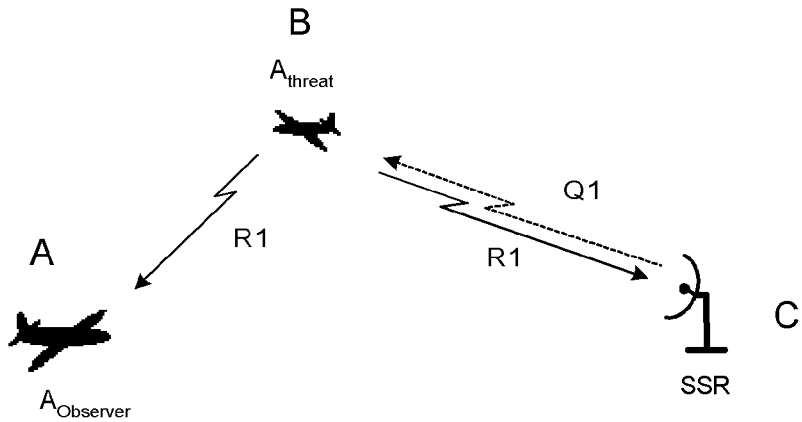
FIG. 3 is a schematic illustration of a passive airborne collision warning system operating in accordance with an embodiment of the invention.

FIG. 3 is a schematic illustration of a passive airborne collision warning system (ACWS) according to an embodiment of the invention mounted on an observer aircraft for determining at least the range and bearing of a nearby transponder-equipped aircraft by receiving its reply signals to SSR. The system of the preferred embodiment includes a phase quadrature direction finding antenna for determining the target aircraft bearing will be described later in greater detail. Furthermore, the passive collision warning device of the present invention can be mounted on the observer aircraft as a single small packaged device and readily connected to a portable computer via a standard communications link.

In order to determine the range, the initial step is to precisely determine the location of the ground-based SSR by first determining the current bearing of the observer aircraft. Determining the positional information of the SSR can be done in one of several ways. One way is to simply lookup the information from a database in memory or e.g. retrieved by radio link. However, precise coordinates of the tens of thousands of SSRs are often difficult to obtain for security reasons, for example. Detailed information of this type on what are deemed "sensitive" sites is generally not made available to the public.

Another technique that produces very good results is to measure the interrogation signals from the rotating SSR to get a bearing on it. The positional information, including coordinates and altitude, of the observer aircraft can be known with great accuracy, preferably by using a receiver capable of receiving signals from a satellite-based navigation system such as Global Positioning System (GPS) or the European Galileo system, or by using a non-satellite based navigation system. The interrogation signals of the observer aircraft by the SSR proceed every several seconds. A bearing measurement is conducted for each interrogation for at least two interrogations, but preferably three or more, in order to obtain a fix on the SSR by triangulation with good accuracy. With the two position points known i.e. the observer aircraft via GPS and the SSR, it is possible to determine the position of a nearby aircraft relative to these coordinates.

Range Estimation

Once the distance between the observer aircraft and the SSR is known the bearing of the target aircraft is determined by using the directional antenna. The estimation of the range from the observer aircraft to the target is difficult to determine initially in a passive system. One technique is to measure the power level of the transponder reply from the target aircraft responding to an SSR interrogation. Unlike a radar system, there is scarce information except for the received signal strength. It is theoretically possible to calculate the range based on the received power using the Friis formula for free space propagation. In any event, this would depend on knowing the transmit power of the target transponder which can vary by manufacturer anywhere from approximately 60–500 W. Since power level information is not included in transponder replies calculating the range in this way is not possible. However, it is possible to determine the cumulative range of the interrogation signal to the target aircraft and the transponder reply signal received at the observer aircraft by detecting the time difference at arrival at the target aircraft. A TSO specified transponder delay of 3 microseconds from interrogation to reply is factored in for the time difference analysis. Knowing the cumulative range of the two signals necessarily places the target aircraft somewhere on an ellipse with the observer aircraft and SSR as the foci.

Figure 4:
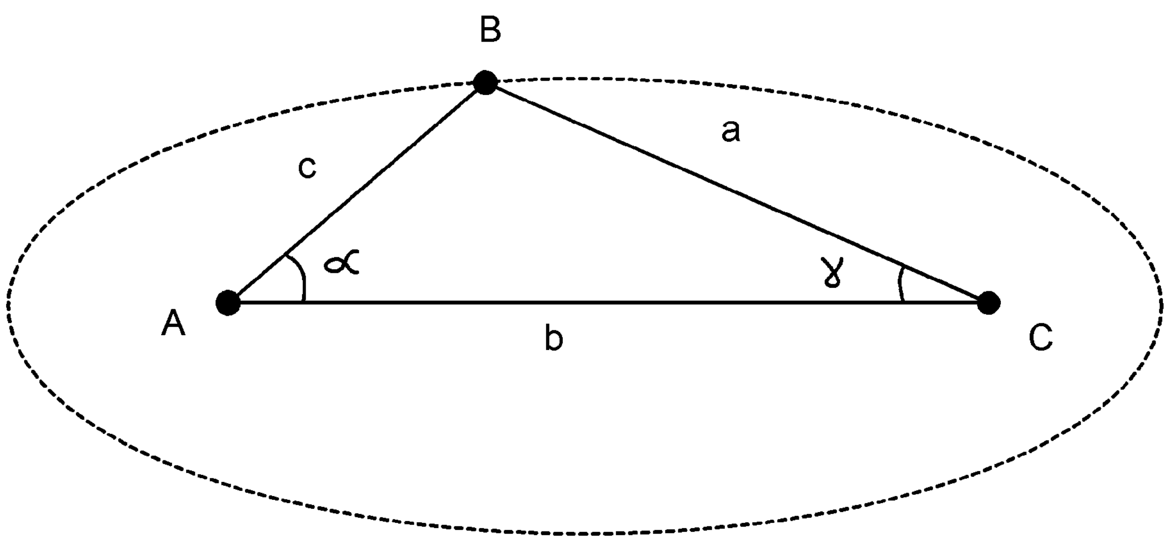
FIG. 4 depicts a geometric illustration of calculating the relative ranges of the associated signals.

FIG. 4 depicts a geometric illustration of calculating the relative lengths of the associated signals in accordance with the invention. The left hand corner of the triangle A represents the observer aircraft whereas corners B and C represent the target aircraft and the SSR respectively. From the first measurement step, the distance b between the observer aircraft and SSR is known. When B is interrogated by the main beam of the rotating SSR, we measure the time difference Δt between the cumulative trip from C-B-A and C-A known from the previous step.

$$\Delta t = t_a + 3\ \mu s + t_c - t_b \qquad (1)$$

where $t_a$, $t_b$, and $t_c$ is the time it takes for the signal to propagate along lengths a, b, and c respectively. The above expression can be converted from being expressed in units of time to distance x leading to, $$\Delta x = a + 900\ \mathrm{m} + c - b \qquad (2)$$

where the speed of electromagnetic propagation is assumed to be approximately $3\times10^8$ m/s. A second equation derived from the law of cosines yields, $$a^2 = b^2 + c^2 2bc^* \cos\alpha \qquad (3)$$

where α is the angle or bearing between the vectors along lengths A-C and A-B that is measured with the directional antenna on the observer aircraft. Solving for equations (2) and (3) to yield c, which enables the target aircraft to be located on the ellipse giving its definitive range and bearing.

The equations are based on the fact that the calculations can be simplified by reducing the problem to a two-dimensions, whereby a tilted-plane defined by three points derived from the observer aircraft, target aircraft, and the ground level SSR, are solved to determine the range c and bearing α of the target aircraft. The technique also applies when the observer and target aircraft are at the same altitude, where the observer and target aircraft and SSR define the plane.

The angular rotational speed ω of the rotating SSR can be estimated by measuring the time between interrogation signals. Stored data on the rotational speed of specific SSRs may not always be accurate since the rotational speed can be varied according e.g. to the density of traffic at a particular time of day or time of year such as during high versus low travel season. Furthermore, attempting to measure the rotational speed while the observer aircraft is moving further complicates the estimate. A more accurate estimation can be achieved by factoring in the motion of the observer aircraft relative to rotating main beam of the SSR by computing the change in the angle Δθ at which the interrogation signal is received on successive rotations. By way of example, if the aircraft is traveling a 360 knots at a 90 perpendicular head to the beam and the SSR is rotating at 1 revolution every 10 seconds, due to the moving aircraft the change in the angle Δθ is roughly equal to arctan( 0.1/(2π) or approximately 5.7 degrees. Therefore a more accurate estimation of the rotational speed ω_hat is ω(1+1.6%). Knowing ω_hat enables an estimate to be made of γ i.e. the angle between the SSR and the target aircraft that also enables us to find the target aircraft on the ellipse in another way to improve or check the position estimate.

The passive airborne collision warning device can be optionally linked to the transponder via a coupler in order to suppress the transponder aboard the observer's aircraft to enable better detection of transponder replies from nearby aircraft. Most modern transponders come equipped with a suppression feature that can be activated to delay response to an interrogation, for a predetermined period of time. Although the maximum length of suppression is regulated, the delay is enough to receive transponder replies from the nearby aircraft. Transponder suppression is not strictly required for the embodiment to operate, however, detection of the target aircraft replies would be improved with suppression enabled. A number of suppression techniques have been described in the prior art which can be implemented to work with the present invention.

Figure 5:
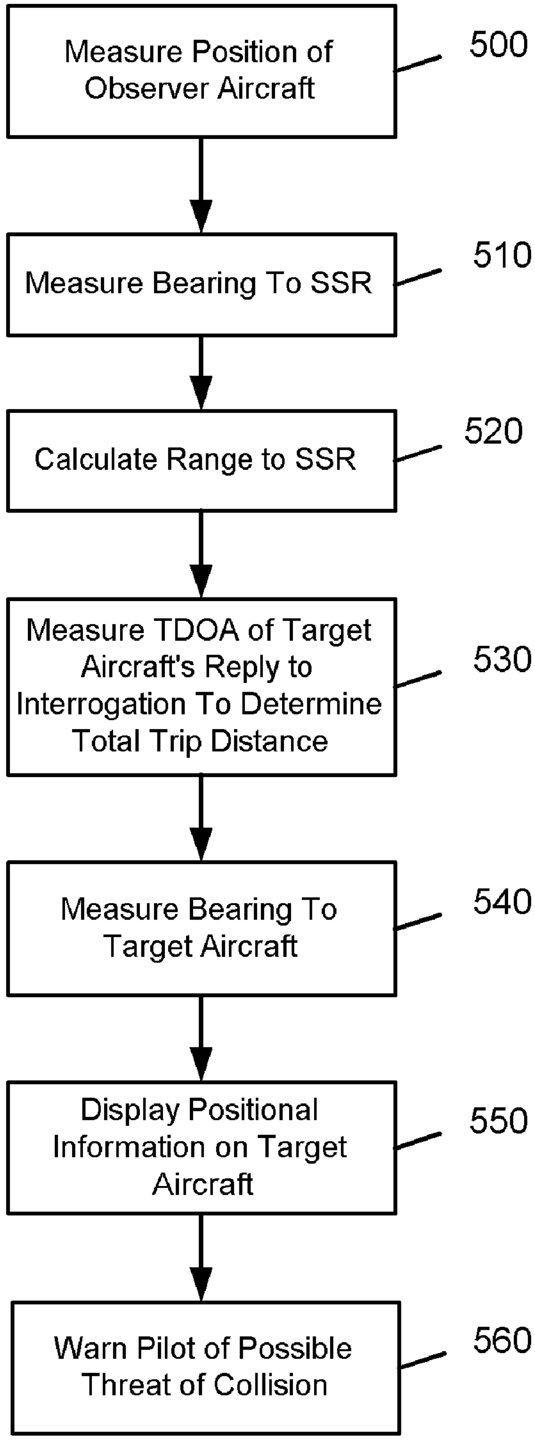
FIG. 5 is a flowchart showing the algorithm operating in accordance with an embodiment of the invention.

FIG. 5 is a flowchart showing the algorithm operating in accordance with an embodiment of the invention. The initial step 500 is to determine with substantial accuracy the current position of the observer aircraft, preferably by a satellite-based service such as GPS or other means. In step 510, the bearing of the SSR is measured using the directional antennas from the SSR interrogation of the observer aircraft, and its range is calculated based on the present position and the time-difference-on-arrival (TDOA) of the interrogation signals, as shown in step 520. In step 530, the observer aircraft monitors the replies of a potentially threatening target aircraft to an interrogation and measures, relative to the observer aircraft's range to the SSR, the TDOA of the reply is used to calculate the total trip distance of the interrogation signal and the reply received at the observer aircraft. The range calculation takes into account the known responder delay time. In step 540, the observer aircraft measures the bearing of the reply signal from the target aircraft thus allowing a calculation of an exact fix on the target aircraft. In step 550, the calculated positional information of the target aircraft is displayed to the pilot aboard the observer aircraft together. A mode C reply from the target aircraft will give its altitude and will warn the pilot of a potential collision threat when the aircraft are at or near the same altitude, as shown by step 560.

Figure 6:
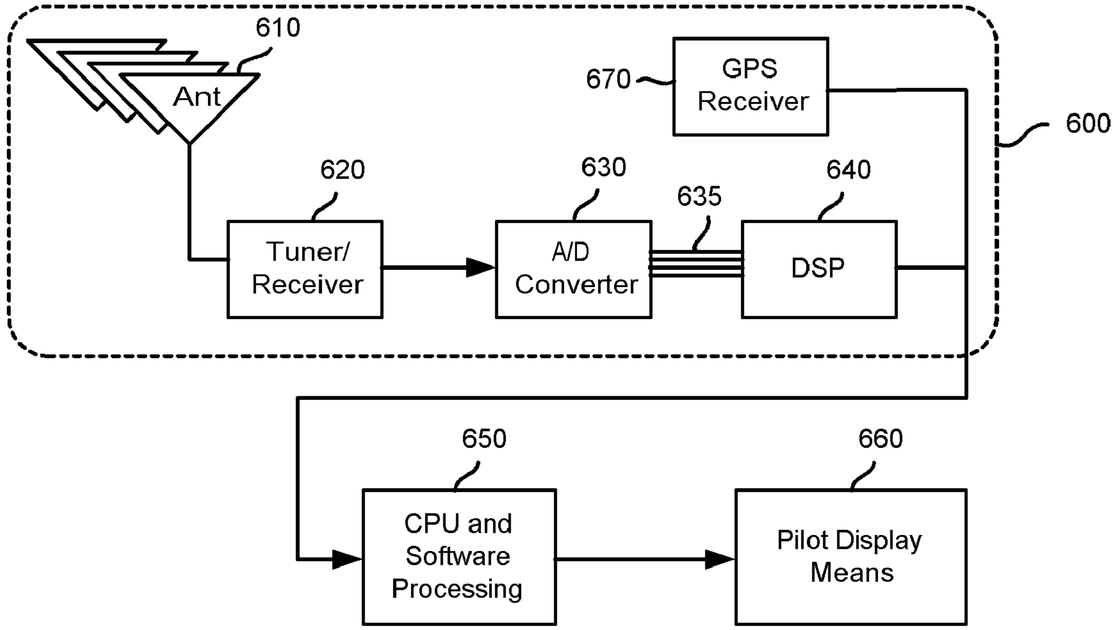
FIG. 6 is a schematic block diagram of the hardware in the embodiment of the invention.

FIG. 6 is a high-level schematic block diagram of the hardware system used in the embodiment of the invention. The preferred embodiment of the collision warning system of the present invention is described with the dashed box 600 indicating the components that are included within a device that is externally mounted on the airframe. The interrogation replies of the target aircraft are received by a multi-element direction finding antenna 610 directional finding antenna 610 and fed into receivers 620 which receive signals on 1090 MHz. Although not essential to the functionality of the invention, it could be helpful to use multiple antennas and receivers that are synchronized in order to better detect the direction of the incoming signals, otherwise the invention may be operative with a single externally mounted device. The output is then fed into A/D converter 630 for which enable processing of the signal by DSP 640. The information sent between A/D converter 630 information and DSP 640 is a complex baseband data x(t) that includes I- and Q-components of in and out-of-phase data in multiple data streams 635 that potentially contain a significant amount of data e.g. approximately 10 MHz×14 bits×2 channels per antenna or more. The DSP functions to determine whether a valid Mode A or C signal is received by which all other non-relevant signals are filtered out. The output from DSP comprises valid Mode A or C information that includes target transponder ID and altitude data for further processing. Furthermore, a GPS receiver 670 is included in the top mounted device for obtaining position information of the observer aircraft.

The data from the DSP is sent via a USB or serial connection to a processor 650, which can be a portable computing device such as a conventional laptop or notebook computer, PDA or the like placed in the cockpit. The DSP also functions to reduce the amount of necessary information to the laptop computer via a well known protocol on e.g. a standard universal serial bus (USB) line. Schematically an information packet could look like:

<type of eq./type of info./clock/data1/data2/ . . . >

Such a packet would typically contain 32 B or less. By way of example, in the case of a single reply signal pulse train detected at 1090 MHz by the direction-finding antenna, the data package sent from 640 to 650 could look like:

<'tcat1'/'R1'/'13:56:45.0000050'/'DOA angle= 312.00'/'[A B C D]=[2 4 5 6]'> meaning that we detected a pulse train with the code 'A B C D' equal to '2 4 5 6' incident from 312 degrees and arriving 5 microseconds after 13:56:45.

The laptop computer is configured to run commercial software package designed to analyze the data. The portable computer enables a fairly sophisticated analysis of the data for display in a user-friendly way to the pilot on a separate multifunctional display, rather than forcing the pilot to look down to monitor the laptop display. Since real estate on the instrument panel is at premium in most small aircraft, the display device 660 must be conveniently accessible for the pilot to monitor while piloting the plane. In the preferred embodiment, the pilot monitors a small multifunctional display that can be strapped to the pilot's leg that is easy to monitor such as the Tactical Pilot Awareness Display or TPAD™ manufactured by navAero Inc. of Chicago, Ill., U.S.A.

Any number of means for warning the pilot of a threat can be implemented, for example, the closing range and altitude of the threatening aircraft may be displayed as a simulated radar screen that can be easily interpreted by the pilot to take evasive action such as changing altitude when the threat is immediate. Alternatively, audible warnings can be given in the form of voiced phrases that indicate the direction of a threatening aircraft that can assist the pilot in making visual contact. Simple descriptive phrases such as those used in early aviation can work well with the invention e.g. "closing threat at ten o'clock low and near," indicating a threatening aircraft is approaching from the northwest and from below or "closing threat at two o'clock high and near," indicating a threat approaching from the northeast from above. Alternatively, audible warnings can be given in the form, for example, of a shrieking beeping alarm that increases frequency when the range of the threatening aircraft is closing. Furthermore, the pilot may be given a sense of the direction the threatening aircraft is approaching from by a stereo-like or surround sound-like experience where the beeps emanate from several speakers positioned around the pilot. Of course the warnings' most useful purpose is to assist the pilot in making traditional visual contact with the threatening aircraft and react accordingly.

Bearing Estimation

When performing bearing estimates, a number of types of direction finding antennas known in the art may be suitable for use with the invention. The topic of angle or Direction-of-Arrival (DOA) of radio signals has been a subject of interest over the last several decades. Ideally, we have information of the incident signals at a number of separate locations. This is obtained by the use of an array of antenna elements. Using the difference in phase between our antenna outputs, we may estimate the DOA in a number of ways, e.g. ESPRIT, MUSIC, WSF. Depending on the number of antenna elements, which can be integrated within a small package device and mounted optionally on the above (with the GPS receiver) and below the aircraft's airframe (without a GPS receiver), multiple signal directions may also be estimated simultaneously.

Figure 7:
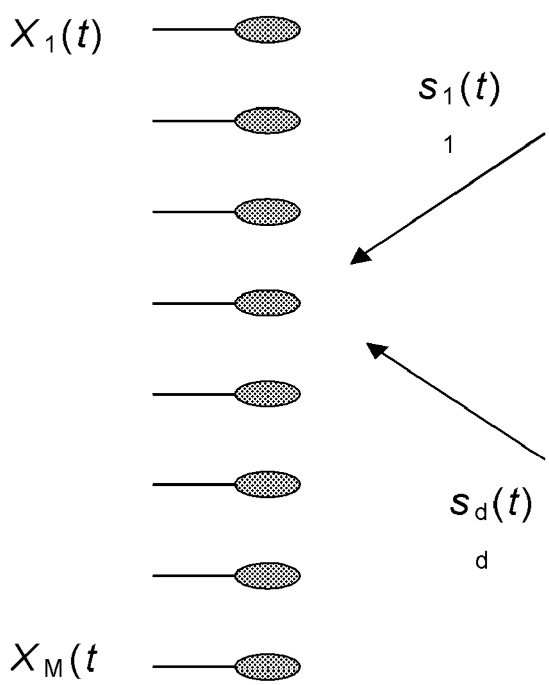
FIG. 7 depicts a Uniform Linear Array directional antenna.

FIG. 7 depicts a so-called Uniform Linear Array with d signals incident. Such an array is limited in that it cannot distinguish between signals from the forward and backward directions. In this case, the antenna array has M elements, which preferably are connected to M digital receivers. The received complex-valued baseband output from each antenna m is denoted $x_m(t)$. Furthermore, the complex response of the m-th antenna element to a signal incident from an angle $\phi_1$ is $a_m(\phi_1)$. In the presence of noise $n_m(t)$, the output signal is:

$$x_m(t)=a_m(\phi_1)s_1(t)+n_m(t) \tag{4}$$

when the incident signal is $s_1(t)$. The functions $a_m(\phi)$ can in general have any form, as long as we have a priori information of it. However, in the case of a uniform linear array the $a_m(\phi)$ differ by a progressive phase shift. For a ULA along the x-axis we then have, $$a_m(\phi)=a_0(\phi)\exp(2j\pi/\lambda(m-1)\Delta\ \sin\phi) \tag{5}$$

where $\Delta$ is the spacing between the elements and $\lambda$ the free space wavelength. This structure is beneficial due to its simplicity and allows us to use computationally efficient methods such as ESPRIT to determine the unknown angles.

The general case when we have M elements and d signals incident from $\phi=[\phi_1, \ldots, \phi_d]$ is described by the matrix equation:

$$x(t)=A(\phi)s(t)+n(t) \tag{6}$$

where, $$x(t)=\begin{bmatrix} x_1(t) \\ \vdots \\ x_M(t) \end{bmatrix},\ A(\Phi)=\begin{bmatrix} a_1(\phi_1) & \cdots & a_1(\phi_d) \\ \vdots & \ddots & \vdots \\ a_M(\phi_1) & \cdots & a_M(\phi_d) \end{bmatrix},$$

$$s(t)=\begin{bmatrix} s_1(t) \\ \vdots \\ s_d(t) \end{bmatrix} \text{ and } n(t)=\begin{bmatrix} n_1(t) \\ \vdots \\ n_M(t) \end{bmatrix}$$

In the matrix equation (6), the unknown parameters are the DOA angles $\phi_1, \ldots, \phi_d$, the signals $s_1(t), \ldots, s_d(t)$ and the variance of the noise, $\sigma^2$. All of these may be estimated using the measured output data x(t). In our case, we are interested in both the DOA angles, which give us the direction to the SSR and the threatening aircrafts, as well as the actual signal waveforms $s_1(t), \ldots, s_d(t)$. These waveforms will for example tell us the altitude of another aircraft responding to a Mode C-interrogation signal. The methods of estimating the aforementioned parameters are well described in the literature. One such method is as follows. First, we sample the signal x(t) at different discrete times $t_1, \ldots, t_N$. This gives us an M×N-array of complex-valued data:

$$X = \begin{bmatrix} x_1(t_1) & \cdots & x_1(t_N) \\ \vdots & \ddots & \vdots \\ x_M(t_1) & \cdots & x_M(t_N) \end{bmatrix}$$

Second, we create an estimate of the covariance matrix of the output signals through a matrix multiplication:

$$\hat{R} = \frac{1}{N} XX^H \text{ where '}H\text{' denotes conjugate-transpose.}$$

The structure of R_hat is now used to estimate the unknown DOA angles φ. Different methods are available, including MUltiple Signal Classification (MUSIC) as described by R. O. Schmidt, "Multiple emitter location and signal parameter estimation", in Proc. RADC Spectrum Estimation Workshop (Griffiths AFB, N.Y.), 1979, pp. 243–258; reprinted in IEEE Trans. Antennas Propagat., vol. AP-34, no. 3, pp. 276–280, March 1986., may work well with the invention and is incorporated by reference. As known by those skilled in the art, other useful methods may include Estimation of Signal Parameters via Rotationally Invariant Techniques (ESPRIT), and Weighted Subspace Fitting (WSF).

Finally, the estimate φ_hat is used to estimate the unknown signals:

$$\hat{s}(t) = A^{\dagger}(\Phi)x(t) \quad (7)$$

where $A^{\dagger}=(A^H A)^{-1}A^H$ is referred to as the pseudo-inverse of A. Equation (7) is recognized as the Least-Square estimate of the unknown signals given our estimate of the DOA. Note that the estimation of the DOA does not only give the direction to an SSR or a threatening aircraft, it also allows us to perform the spatial filtering in (7). This makes it possible to decode several simultaneous signals.

Figure 8:
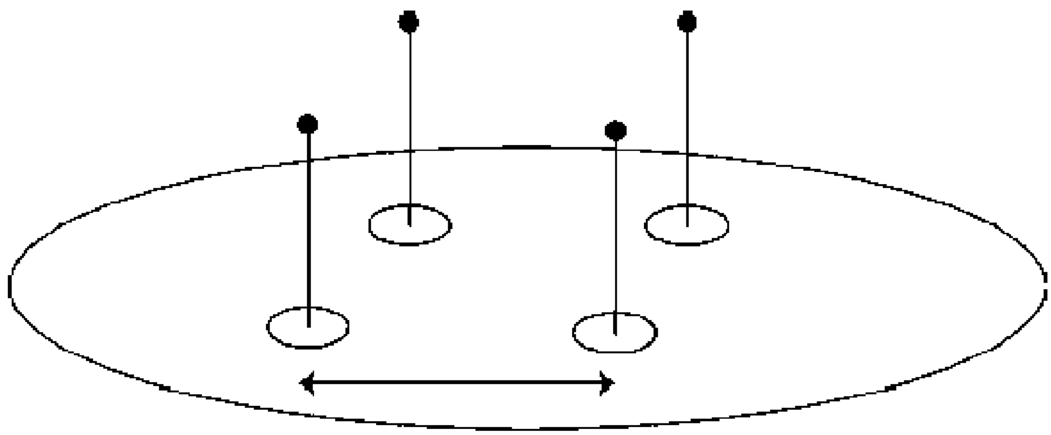
FIG. 8 depicts a Uniform Circular Array directional antenna.

For the capability to receive signals from 360 degrees, a Uniform Circular Array (UCA) antenna may be used that includes 4 monopole antennas having spacing of Δ, as shown in FIG. 8. Such an array can also detect elevation angle, even though the sign cannot be determined, i.e. if the signal is incident from above or below. Thus use of a circular or spherical array enables direction finding in azimuth □ and elevation φ where the corresponding vector parameters having d signals incident are $[\theta_1, \ldots, \theta_d]$ and $[\phi_1, \ldots, \phi_d]$.

However, as in the case of the ULA, the method requires that there are the same numbers of receivers as there are antennas. Since receivers are relatively costly, power-consuming and bulky, it is of interest to minimize their number. An alternative antenna arrangement that can provide this is the so-called switched array antenna that operates by having a single receiver that listens to each element in turn. It is also possible to use the same element constantly, but instead switch a number of parasitic elements on or off. This changes the antenna patterns so that different information is obtained for different switch positions. Such antennas are sometimes referred to as Switched Parasitic Elements (SPA).

Figure 9:
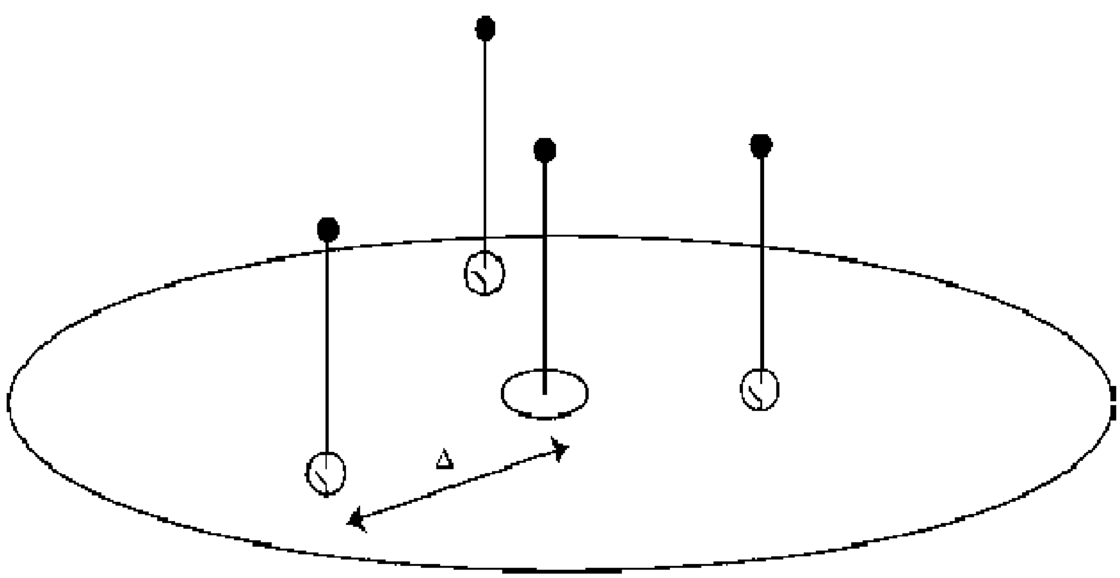
FIG. 9 shows a Switched Parasitic Antenna directional antenna.

FIG. 9 shows a Switched Parasitic Antenna with a driven monopole and three parasitic elements that can be connected to ground by closing a switch. With two switches closed and one open, the antenna will have a directional and asymmetric pattern.

The accuracy of the DOA estimates typically depends on a number of factors, for example:

- The Signal-to-Noise ratio (SNR), i.e. the received power Pr and the variance of the noise $\sigma^2$.
- The number of snapshots N of the signals: the more information we have, the less is the influence of the random noise.
- The number of signals present. More signals will in general make DOA estimation more difficult.
- The angular separation between the different signals.
- The derivative of the antenna pattern response with respect to angle: this increases the error as the array spacing decreases.
- Deviations in the antenna behavior from ideal. All DOA estimators depend on some a priori knowledge of the antenna array. Manufacturing errors or unknown effects will increase error.
- The possibility of system calibration, preferably in situ.

Depending on the properties of the signals, it is possible to derive the minimum variance in DOA estimation if the best possible method is used. These limits are called Cramer-Rao Bounds (CRB). However, it has been found that the CRB for the case of so-called White Gaussian signals. The full expressions include some fairly complicated matrix algebra, but for the case of a single signal, the variance B is proportional to:

$$B\alpha(\sigma^2/N)(1/(|\partial A_m/\partial\phi|^2 P_y))$$

where $A_m$ is the complex-valued antenna pattern of element m. By way of example, a three element SPA with radius of λ/4 (75 mm in our case), the square root of the CRB (i.e. the standard deviation of the error) can be as low as 1 degree for two signals separated by 4°, a SNR of 10 dB, and N=1000 samples, as described in FIG. 8.4 by Thomas Svantesson, "Antennas and Propagation from a Signal Processing Perspective", Ph.D. Thesis, Dept. of Signals and Systems, Chalmers University of Technology, Gothenburg, Sweden, 2001.

Figure 10:
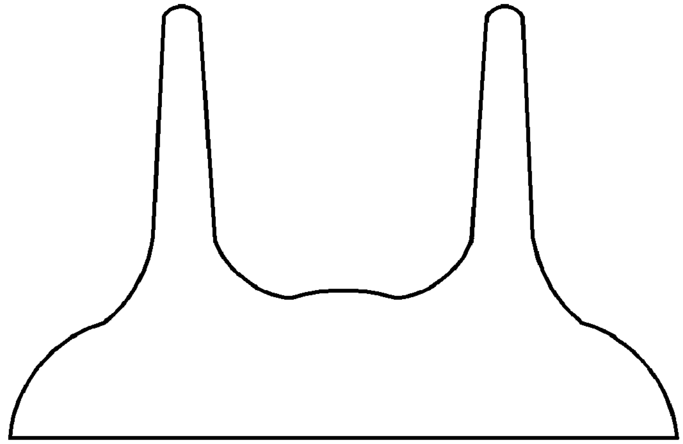
FIGS. 10 and 11 show a schematic front view and perspective view of the aircraft mounted device according to the embodiment of the invention.
Figure 11:

FIGS. 10 and 11 show a schematic front view and perspective view of the passive airborne collision warning device according to the embodiment of the invention that is directly mountable externally on the aircraft's airframe. The externally mountable aerodynamic device includes the directional antenna elements, DSP such as a Field Programmable Gate Array (FPGA), and the GPS receiver components. The external detection unit package can provide data to a small pilot display via a portable computer using a standard universal serial bus (USB) link or serial port connection that can also power the components in the externally mounted device. In another embodiment, it is possible for only the directional antenna elements and GPS receiver to be included in the externally mounted device such that the other components can be located inside the aircraft. The manufacturing cost of the device is relatively low since most of the components for receiving and preliminary processing of the signals are constructed into a device where costs can be economized. Although, the antenna elements may be self-contained within the device it is possible to connect the device to other antennas to still further improve reception. The data from the externally mounted device is processed by connecting it via e.g. a USB link to the portable computer which has the benefit of providing high processing capabilities and simplifying the installation by eliminating the complicated wiring found in prior art systems.

For improved detection top and bottom antennas could be mounted on the aircraft using a split-receiver arrangement. Alternatively, two or more devices may be attached above and below the observer aircraft to detect threats whose signals may be obscured by the airframe, however, only the top mounted device needs to include GPS capability. The device of the invention can be implemented to detect and track more than one aircraft simultaneously using multiple receivers and antenna elements and using a signal receiving method such as MUSIC. By way of example, it is possible to have four receivers where one receiver is able to detect SSR signals on 1030 MHz and the other three receivers are available to track the reply signals of target aircraft 1090 MHz. This would enable simultaneous tracking of separate aircraft while still being able to scan the signals from the SSR to make it possible to identify a specific interrogating SSR.

The foregoing description of the preferred embodiment of the present invention has been presented for purposes of illustration and description. The embodiments are not intended to be exhaustive or to limit the invention to the precise forms disclosed, since many modifications or variations thereof are possible in light of the above teaching. For example, the invention is not strictly limited to locating airborne aircraft but can be applied to applications where transponder-equipped objects such as automobiles and land/seafaring animals can be located and tracked. The transponders in these cases can be responsive to interrogation signals that emanate from land-based or airborne/satellite-based signal sources.

Still other modifications will occur to those of ordinary skill in the art, all of which and its variations lie within the scope of the invention. It is therefore the intention that the following claims not be given a restrictive interpretation but should be viewed to encompass variations and modifications that are derived from the inventive subject matter disclosed.

What is claimed is:

1. A collision warning system mounted on an observer aircraft for passively detecting and tracking nearby target aircraft equipped with a transponder responsive to interrogation signals from a rotating radar source, comprising:

direction finding antenna means for receiving signals from the radar source and the transponder-equipped aircraft and measuring the bearing of said signals;

means for determining the position of the observer aircraft;

means for determining the position of the radar source;

means for determining the total trip distance from the radar source to the target aircraft to the observer aircraft;

means for determining the position of the target aircraft from the range to the radar source, the total trip distance, and the bearing of the target aircraft relative to the observer aircraft measured by said direction finding antenna means; and means for warning the pilot of the observer aircraft of the presence of the target aircraft for collision avoidance.

2. The collision warning system according to claim 1, wherein said direction finding antenna means and said means for determining positional information of the observer aircraft are included in a external device mounted on the observer aircraft.

3. The collision warning system according to claim 2, wherein said means for determining positional information of the observer aircraft includes means for receiving satellite navigation signals from the GPS or Galileo navigation systems, or by using a non-satellite navigation system.

4. The collision warning system according to claim 2, further comprising processing means for use in a portable computer connected to the external device for receiving data from the external device, wherein the computer, executes a control program for processing the data for output to said warning means to alert the pilot of the presence of the target aircraft for collision avoidance.

5. The collision warning system according to claim 1, further comprising a display accessible and convenient to the pilot of the observer aircraft while piloting the aircraft.

6. The collision warning system according to claim 1, wherein said warning means includes audio means for alerting the pilot of the presence of the target aircraft for avoiding collisions.

7. The collision warning system according to claim 1, wherein said direction finding antenna means is a multi-element direction finding antenna capable of simultaneously receiving signals from at least two target aircraft and the rotating radar source using a signal receiving method from any one of ESPRIT, MUSIC, or WSF.

8. A method of collision avoidance by determining the position, relative to an observer aircraft, of at least one target aircraft equipped with a transponder transmitting reply signals in response to interrogation signals from a rotating radar source comprising the steps of:

a) determining the position of the observer aircraft;

b) determining the position and range of the radar source relative to the observer aircraft by measuring the bearing of interrogation signals with a direction finding antenna;

c) determining the bearing of the target aircraft relative to the observer aircraft by measuring reply signals with a direction finding antenna;

d) determining the position of the target aircraft with a computer executing software for processing data comprising the determined positions of the observer aircraft and radar source, and the measured bearing of the target aircraft; and e) presenting the position of the target aircraft relative to the observer aircraft to the pilot of the observer aircraft to assist in collision avoidance.

9. The method according to claim 8, wherein the position of the observer aircraft is determined by using a receiver capable of receiving satellite-based navigation signals from any one of the GPS or Galileo navigation systems, or by using a non-satellite navigation system.

10. The method according to claim 9, wherein the receiver and the direction finding antenna are included in a device mounted externally on the observer aircraft, whereby the computer is linked to the device and processes data received from said device.

11. The method according to claim 10, wherein the externally mounted device further includes a tuner for receiving the interrogations and transponder replies, a A/D converter, and a DSP for processing the received signals.

12. The method according to claim 8, wherein step d) further comprises:

calculating the distance of the cumulative propagation trip distance of the interrogation signal from the radar source to the target aircraft and the reply signal from the target aircraft to the observer aircraft; and determining the position of the target aircraft, relative to the observer aircraft, based on the bearing of the target aircraft, the distance of cumulative signal propagation, and the range to the radar source.

13. The method according to claim 8, wherein step e) includes presenting the position of the target aircraft relative to the observer aircraft on a display device that is conveniently accessible to the pilot of the observer aircraft while piloting the aircraft such that the display device is positioned on any one of the cockpit instrument panel, or on a display device attached to the pilot's leg.

14. The method according to claim 8, wherein the presenting step includes audio warnings that alert the pilot of the presence or location of the target aircraft to assist in collision avoidance.

15. The method according to claim 8, wherein the position of the target aircraft are tracked by storing in a memory of the computer the relative positions of the target aircraft over predetermined period of time.

16. The method according to claim 8, wherein the direction finding antenna uses a signal receiving method from any one of MUSIC, ESPRIT, or WSF to determine the bearing of said signals.

17. The method according to claim 16, wherein the direction finding antenna uses the MUSIC signal receiving method that is operative in the azimuth and elevation directions.

18. The method according to claim 8, wherein said direction finding antenna means is a multi-element direction finding antenna simultaneously receiving signals from at least two target aircraft and the rotating radar source using a signal receiving method from any one of ESPRIT, MUSIC, or WSF.

19. The method according to claim 8, wherein the angular rotational speed of the rotating radar source is estimated by factoring in the motion of the observer aircraft relative to the rotation of the radar source by computing the change in the angle $\Delta\theta$ at which the interrogation signal is received on successive rotations of the radar source.

20. The method according to claim 8, whereby the position of transponder-carrying objects from any one of automobiles and land/seafaring animals can determined.

21. A computer program product for displaying the relative position of a target aircraft to an observer aircraft comprising:

a computer readable storage medium having a computer readable program code means embedded in said medium, the computer readable program code means comprising:

a) a first computer instruction means for receiving signals data from a direction finding antenna, wherein the signals include interrogation signals from a rotating radar source and reply signals responsive to interrogations signals from a transponder equipped target aircraft;

b) a second computer instruction means for receiving satellite navigation signals data for determining the position of the observer aircraft;

c) a third computer instruction means for determining the position of the target aircraft from said data;

d) a fourth computer instruction means for displaying the target aircraft relative to the observer aircraft at a periodically updated position.

22. The computer program product according to claim 21, wherein the computer readable storage medium containing the computer readable program code is operable for controlling a portable computer such as a laptop computer or PDA to display the relative position of a target aircraft to an observer aircraft.

* * * * *